Patented Jan. 8, 1935

1,987,549

UNITED STATES PATENT OFFICE 1,987,549

METHOD OF COATING POROUS MATERIAL

Robert P. Courtney, Maplewood, N. J., assignor to Bakelite Corporation, New York, N. Y., a corporation of Delaware No Drawing. Application November 14, 1930, Serial No. 495,790

4 Claims. (Cl. 91—68)

This invention relates to compositions suitable as coating compositions for application to porous or fibrous surfaces.

Coating compositions accomplish their function of protecting the surfaces of materials to which they are applied by remaining on the surfaces; portions which penetrate below the surfaces are largely waste and of no particular utility for this purpose of surface protection. In fact penetration below the surface is at times objectionable on account of the modifying effect exerted on the properties of the base material such as its flexibility, etc. It is with regard to the lessening or minimizing of the penetrative nature of coating compositions that this invention is primarily concerned.

Coating compositions in general comprise a liquid vehicle and the vehicle regarded as best adapted for many purposes is a drying oil, such as boiled linseed oil or tung oil. In order to give body to a drying oil film and otherwise improve its properties it is customary to include some filling or distending agent. Substances having a marked improving effect on drying oils are the phenolic resins made compatible with or soluble in oils, but more particularly phenolic resins which in themselves possess the oil-soluble property and resin compositions which have been made with a drying oil as an ingredient of the reaction mass and described in a patent to Turkington No. 1,677,417, granted July 17, 1928. These resins or compositions greatly accelerate the drying time of a varnish or coating composition containing them, while at the same time the hardness, toughness, alkali and water resistance of a deposited film are also materially improved. The requisite thinness of the coating composition or varnish for brushing, lacquering, etc. is obtained by including suitable volatile solvents.

I have found that the penetrative effect of a varnish made with oils and resins or oil-resin compositions and thinned with solvents can be overcome or eliminated to a surprising degree by preparing an emulsion of the varnish and water in such a manner that when applied to paper, the varnish portion separates and is largely left on the surface of the paper or other porous base. This I accomplish by controlling the conditions under which the emulsion or dispersion is prepared and/or by the inclusion of a protective colloid of a nature favoring the dispersion of the varnish in the water. It is possible, however, to have the water as the disperse phase in a varnish medium provided conditions are present such that, when the emulsion is applied, the water particles contact the paper and there is a preferential absorption by the paper of the water particles.

As a specific illustration of the present invention an oil-resin composition is prepared in accordance with the disclosure of the Turkington patent above from cresol, formaldehyde, tung oil and some rosin with hexa as a converting agent. A suitable solvent such for example as a mixture of xylol and butyl acetate is added to form a varnish. An emulsifying agent also is preferably included and triethanolamine, for example, is satisfactory for this purpose; the amount of triethanolamine or other emulsifying agent included with the above resin-oil composition is about 2 to 10% based on the water content. The varnish so prepared is then gradually added to water with agitation to form the emulsion; pigments, colors, etc. thereupon can be incorporated. The amount of varnish that can be included in a given amount of water with the varnish remaining as the disperse phase depends upon the agent and speed of agitation; but as high as 99% of the emulsion can be varnish without changing over into a water-in-varnish emulsion as indicated by tests made by diluting with water.

As an additional illustration, an oil-soluble resin is prepared by reacting a phenyl-phenol with formaldehyde, preferably with the amount of formaldehyde in excess of molecular proportions, in the presence of a catalyst such as oxalic acid. This resin after dehydration is made into a varnish by heating with a fatty oil as tung oil; best results seem to follow from heating about equal weights of resin and tung oil for about an hour at about 200° C. and then incorporating such additional amounts of tung oil or other fatty oil or mixture of tung oil and other fatty oil as linseed oil, as is desired followed by a short heating period. For air-drying varnishes or coating compositions it is desirable to include a small percentage of a drier such as 0.1 to 1.0 per cent of cobalt linoleate or other known drying agent. Suitable solvents such as petroleum solvents, cellosolve (monoethyl ether of glycol), xylol or mixtures of these are stirred into the mass while it is maintained at a suitable temperature; the amount of solvent added depends upon its insolubility in water and the viscosity desired, but a weight of a water insoluble solvent as specified above equal to the weight of the oil-resin composition yields a varnish suitable for most purposes. To prepare an emulsion of such a varnish, casein for example, is dispersed in water made ammoniacal by the addition of strong ammonia; the varnish is slowly added into the casein solution and agitation causes an emulsion to form. The more rapid the agitation the thicker will be the emulsion. If the varnish is added too rapidly, the emulsion may become one of water in varnish, but slow addition and rapid agitation produces a varnish in water emulsion. The nature of the emulsion is determined by adding a small amount to water; if it can be dispersed in the water it is regarded as one of varnish in water. Varnish in water emulsions are preferred since the possibility of dilution with water permits the use of relatively small amounts of water-insoluble solvents in the preparation of the varnishes.

As emulsifying agents a wide variety of substances can be used. For example gelatin, camphor, tannic acid, lamp black, lead acetate, starch, gum arabic, acid casein solution, soaps and the like normally produce solutions of varnish in water. Bentonite, ammonium linoleate, triethanolamine and its fatty acid soaps or compounds and basic casein solution quite readily form emulsions of varnish in water; in fact these are preferred agents. It is not necessary, however, in every case that an emulsifying agent be included; some varnishes apparently have ingredients present that function as emulsifying agents.

When such an emulsion is applied to paper or other porous material it is found that the emulsion is destroyed through the absorption of the water medium and the varnish constituent is left on the surface to there form a film which can be air-dried, if the varnish is of that type, or baked. Due to the retention of the film largely on the surface a more uniform and better film results. Furthermore, when the varnish is applied as such, its viscosity must be fairly high to prevent undue penetration, but then there may be difficulty in causing the resin particles to flow together to give a continuous film upon removal of the solvent; with a water emulsion of the varnish the viscosity may be kept low so that there is increased assurance of the formation of a continuous film as it dries. An improved resistance to water penetration and other liquids thereby follows in the coated articles.

The emulsions of this invention can be applied by brush, roll (gelatin or rubber) screen, knife or spray, depending on its consistency. They can be used as inks for applying designs and they are particularly useful in this connection in place of slow drying oil colors in the manufacture of wall paper since water colors can be mixed into the emulsions and the printed designs are not affected by water. They are also adapted for coating leather in the manufacture of so-called patent leather. They can be used as waterproof surfaces for plaster tiles or be included in plaster compositions, calcimine, etc. provided adjustment is made for salts that are present so as not to break the emulsions. They are applicable to cloth, paper, etc; and even with more porous materials such as celotex, masonite, etc., there is a marked improvement in the retention of the varnish at or near the surface.

The term varnishes is used herein as equivalent to the expression "coating compositions". These compositions are generally solutions; but it is to be understood that oil-resin compositions in the liquid form not necessarily incorporating solvents and which can be applied in the same manner as varnishes to form coatings are comprehended within the meaning of the term varnishes.

I claim:

1. Method of applying a penetrative oil-synthetic resin varnish to the surface of a porous material without any substantial penetration of said porous material by the varnish which comprises forming an emulsion of the varnish in a volatile non-solvent liquid, and applying the emulsion to the surface of the material.

2. Method of applying a penetrative oil-synthetic resin varnish to the surface of a porous material without any substantial penetration of said porous material by the varnish which comprises forming an emulsion of the varnish in water, and applying the emulsion to the surface of the material.

3. Method of applying a penetrative oil-synthetic resin varnish to the surface of a porous material without any substantial penetration of said porous material by the varnish which comprises forming an emulsion of a penetrative oil-resin varnish including a phenolic resin of the oil-soluble type in a volatile non-solvent liquid, and applying the emulsion to the surface of the material.

4. Method of applying a penetrative oil-synthetic resin varnish to the surface of a porous material without any substantial penetration of said porous material by the varnish which comprises forming an emulsion of a penetrative oil-resin varnish including a phenolic resin of the oil-soluble type in water, and applying the emulsion to the surface of the material.

ROBERT P. COURTNEY.